(12) United States Patent
Rindtorff et al.

(10) Patent No.: US 6,246,793 B1
(45) Date of Patent: Jun. 12, 2001

(54) METHOD AND APPARATUS FOR TRANSFORMING AN IMAGE FOR CLASSIFICATION OR PATTERN RECOGNITION (75) Inventors: Klaus Rindtorff, Weil im Schoenbuch; Volker Rudolph, St. Maergen, both of (DE)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 08/962,786

(22) Filed: Nov. 3, 1997

Related U.S. Application Data (63) Continuation of application No. 08/659,101, filed on Jun. 3, 1996, now abandoned, which is a continuation of application No. 08/189,625, filed on Feb. 1, 1994, now abandoned.

(30) Foreign Application Priority Data

Feb. 3, 1993 (EP) .................................................. 93101621

(51) Int. Cl.$^7$ ........................................................ G06K 9/34
(52) U.S. Cl. .......................... 382/174; 382/187; 382/199
(58) Field of Search .................................... 382/168, 174, 382/182, 185, 187, 190, 203, 289, 199

(56) References Cited

U.S. PATENT DOCUMENTS

| | | | |
|---|---|---|---|
| 3,582,883 | * 6/1971 | Shepard | 382/206 |
| 3,999,161 | * 12/1976 | Van Bilzem et al. | 382/203 |
| 4,028,674 | * 6/1977 | Chuang | 382/123 |
| 4,081,791 | * 3/1978 | Pollard et al. | 382/182 |
| 4,163,213 | * 7/1979 | Nadler | 382/204 |
| 4,286,255 | * 8/1981 | Siy | 382/123 |
| 4,561,106 | * 12/1985 | Yoshida et al. | 382/203 |
| 5,033,097 | * 7/1991 | Nakamura | 382/174 |
| 5,231,695 | * 7/1993 | Harrington | 382/199 |
| 5,267,325 | * 11/1993 | Baron et al. | 382/174 |
| 5,321,770 | * 6/1994 | Huttenlocher et al. | 382/174 |

FOREIGN PATENT DOCUMENTS

| | | | |
|---|---|---|---|
| 54-64431 | 5/1979 | (JP) | G06K/9/00 |
| 57-113185 | 7/1982 | (JP) | G06K/9/62 |
| 61-5383 | 1/1986 | (JP) | G06K/9/36 |
| 03156589 | 7/1991 | (JP) | G06K/9/72 |
| 0444187 | 2/1992 | (JP) | G06K/9/62 |
| 03225578 | 10/1992 | (JP) | G06K/9/34 |

OTHER PUBLICATIONS

"Digital Image Processing" Gonzales and Woods, 1992 pp. 524–528.*

* cited by examiner

Primary Examiner—Matthew C. Bella
(74) Attorney, Agent, or Firm—Kenneth A. Seaman

(57) ABSTRACT

The invention relates to a method and apparatus for transforming an image for classification or pattern recognition. At least two distinct projections are carried out in order to define boundaries and shadows of the transformed image. The transformed image is the basis for further analysis such as the calculation of parameter values to be verified.

9 Claims, 6 Drawing Sheets

METHOD AND APPARATUS FOR TRANSFORMING AN IMAGE FOR CLASSIFICATION OR PATTERN RECOGNITION

The application is a continuation of application Ser. No. 08/659,101 filed Jun. 3, 1996, now abandoned, which is a continuation of application Ser. No. 08/189,625 filed on Feb. 1, 1994 now abandoned.

BACKGROUND OF THE INVENTION

1. Field of the Invention

The invention relates to a method and apparatus for automatically transforming an image for classification or pattern recognition and in particular to a method of automatically verifying or recognizing handwritten or machine printed text.

2. Description of Related Art

U.S. Pat. No. 4,523,331 discloses a computer algorithm and apparatus for automated image input (including recognition), storage and output (including image generation). Each image is transformed into a unique binary number and then stored as such. Means for processing handwriting and colored images are also disclosed. Image recognition and matching takes place by comparing the binary value of the new image received against all images stored in the descending order of difference in binary values. Thus, the computer is able to recognize bad handwriting even when the difference between the ideal or stored samples on the one hand and the new image is substantial without consistency. The computer also stores data about its errors as well as corrections received from the user. For this and other reasons each user has a unique number.

U.S. Pat. No. 4,654,873 discloses a pattern segmentation and recognition system in which handwritten characters are transformed electrically into 2-dimensional image patterns, wherein if ambiguity exists in segmenting a unit pattern including a character from the image patterns, character recognition is not made compulsively, but a plurality of possible unit patterns are first established. Then, the various unit patterns are segmented, and each unit pattern is identified to be a partial pattern, linked patterns, etc., so that each character is recognized on a basis of total judgement, whereby ambiguity of segmentation is resolved.

U.S. Pat. No. 4,972,499 discloses a pattern recognition apparatus which has a contour segmentation unit for dividing an input pattern into segments, a characteristic extraction unit for extracting characteristics of the input segments, and a reference unit for storing characteristic data of reference patterns. The reference unit includes a main reference and a detailed matching reference. The main reference stores partial pattern characteristic data representing the characteristics of segments of each reference pattern. The detailed matching reference stores detailed characteristic data of each reference pattern together with a program for specifying an operation procedures thereof. A matching processor sequentially compares and collates the input pattern with the reference patterns to find out that standard pattern with which the input pattern is matched with the highest similarity. When the input pattern is matched with several reference patterns, a detailed recognition unit performs a detailed recognition process using the detailed characteristic data of these reference patterns to finally select the correct one from among the reference patterns. The main reference additionally stores identification marks to identify specific reference segments necessary to acquire the above detailed characteristic data.

U.S. Pat. No. 4,769,716 discloses an improved method for transmitting facsimiles of scanned symbols. Prototype facsimiles of each symbol in a library are enhanced by averaging the representations of each scanned symbol with a respective previously created prototype facsimile for that symbol. The amount of white space at opposite sides of each symbol prototype is determined. The enhanced prototype facsimile for each scanned symbol is associated with positional parameters denoting the average white space at said opposite sides of each symbol.

U.S. Pat. No. 4,718,103 discloses a system in which a handwritten pattern approximated to series of polygonal lines consisting of segments is compared with a candidate pattern selected from dictionary patterns stored in the memory, basing on the angular variation between adjacent segments of both patterns. If the difference between angular variations of adjoining segments of both patterns is outside of a certain range, it is tested whether the difference between an angular variation across three or more consecutive segments and the above reference angular variation is within the range.

U.S. Pat. No. 4,653,107 discloses a system in which coordinates of a handwritten pattern drawn on a tablet are sequentially sampled by a pattern recognition unit to prepare pattern coordinate data. Based on an area encircled by segments created by the sampled pattern coordinate data of one stroke and a line connecting a start point and an end point of the one-stroke coordinate data, the sampled pattern coordinate data of the one stroke is converted to a straight line and/or curved line segments. The converted segments are quantized and normalized. The segments of the normalized input pattern are rearranged so that the input pattern is drawn in a predetermined sequence. Differences between direction angles for the rearranged segments are calculated. Those differences are compared with differences of the direction angles of the dictionary patterns read from a memory to calculate a difference therebetween. The matching of the input pattern and the dictionary pattern is determined in accordance with the difference. If the matching fails, the first or last inputted segment of the input pattern is deleted or the sampled pattern coordinate data of the next stroke is added, to continue the recognition process.

U.S. Pat. No. 4,284,975 discloses a pattern recognition system operating on an on-line basis for handwritten characters, in particular for hand-written Chinese characters comprising a character input unit for providing the coordinates of a plurality of points on the strokes of a written input character, a classification unit for classifying the input characters to the first group having equal to or less than three strokes, and the second group having equal to or more than four strokes, an approximate unit for providing a plurality of feature points to each of strokes, the number of strokes being six for each stroke in the first group of characters and three for each stroke in the second group of characters, a pattern difference calculator for providing the sum of the length between the feature points of the input character and those of the reference characters which are stored in the reference pattern storage, and a minimum difference detector for determining the minimum length among the pattern differences thus calculated. The input character is recognized to be the same as the reference character which provides said minimum length.

U.S. Pat. No. 4,972,496 discloses a keyboardless entry computer system which includes a transparent input screen that generates positional information when contacted by a stylus, and a display screen mounted physically below the input screen such that a character that is displayed can be seen below the input screen. The system includes a computer that has been programmed to compile the positional information into strokes, to calculate stroke characteristics, and then compare the stroke characteristics with those stored in a database in order to recognize the symbol drawn by the stylus. Key features of the system are: (1) transparent position sensing subsystem; (2) underlying display on which to mimic drawing of sensed positions and to show characters or symbols; (3) means to convert sensed positions first into plotted points and then into recognized characters or symbols; and (4) means to "learn" to associate sensed input positions with a character or symbol.

Unpublished European Patent Application No. 92 116 605.4 of International Business Machines Corporation (the assignee of the present invention) shows a handwriting recognition system using a prototype confusability dialog. The subject matter of this patent application is directed to a procedure for interactive editing of prototypes that are close to each other in prototype space and to on-line recognition of handwriting by prototype matching.

From European Published Application 483,391, a method of automatically verifying a signature of an individual and an apparatus for carrying out this method is known. In the reference signature analysis mode one or more reference signatures of an individual are processed for storing sets of reference diameter values. This mode provides the basis for future verifications based on said reference parameter values. In the signature verification mode one present signature of an individual is processed for creating sets of parameter values to be verified. Depending on the stored sets of reference parameter values and the corresponding sets of parameter values to be verified, it is decided if the present signature is true or false with regard to the corresponding reference signature.

Automatic systems purporting to recognize cursive script writing or other types of written or printed text have so far met with only limited success. The reason for that can be traced largely to the lack of robustness exhibited by the templates and the parameters used in the modelling of handwriting. For example, reference is made to U.S. Pat. No. 4,731,857 which describes a three-step procedure for the recognition of run-on handwritten characters. The recognition algorithm is a template matching algorithm based on dynamic programming. Each template is a fully formed character presumably representative of the writer's average way of forming this character, and the elastic matching scores of the current character are computed for each template. This strategy is vulnerable to the extensive variability that can be observed both across writers and across time.

Accordingly, the systems of the prior art have significant disadvantages and limitations.

SUMMARY OF THE INVENTION

It is therefore an object of the invention to overcome the limitations of the foregoing system and provide an improved method for transforming an image for automatic classification or pattern recognition.

The object of the invention is solved basically by applying the features set forth in the specification and the independent claims. Preferred embodiments of the invention are described in the description of the preferred embodiment and the claims, particularly the dependent claims.

According to the present invention a shadow of a text or a word, such as a signature, or of a segment of a word, is generated by at least two projections. The original image of the text together with its shadow or shadows results in a transformed image. The shadows are particularly relevant for classification or recognition purposes, since the shadows emphasize significant regions of the image. The position, the size or the boundary of the shadows, or any combination thereof, is therefore used to characterize and classify the image.

The kind of projection which is preferably used is parallel projection, but any other type of projection producing shadows of the image is also suitable.

According to a preferred embodiment of the invention, the internal structure of the shadows is analyzed. This analysis is aimed to find out whether the shadow covers portions of the original image. For this purpose, two alternative methods are devised:

According to the first method, one or more further projections are carried out into a direction substantially orthogonal to a portion of the border of a shadow. With each repetition a certain area of the shadow is deleted. A specific region which is deleted in a specific iteration of this process is assigned an identifier. The identifier of that region contains information as to the complexity of this particular portion of the shadow within the entire structure which is analyzed.

According to a disclosed alternative method, the internal structure of a shadow being completely circumscribed by the boundaries of the original image is analyzed. Therefore, a portion of that circumscribing boundary is stripped off and a further projection is carried out. The area of the shadow which is thereby deleted again gets assigned an identifier thereto. This operation of stripping off and subsequent projections is carried out repeatedly.

The inventive method is also used for text segmentation, such as segmentation of individual words or characters. Gaps in the transformed image serve to deliminate individual segments.

The inventive method is also employed to determine the slant of cursive text being composed of italic letters or characters. If at least one of the projections which is carried out has a reference line having approximately an inclination angle equal to the slant of the cursive text, the resulting shadow becomes minimal. Only in this case gaps occur in the transformed image of the cursive text so that this kind of projection is also important for the segmentation of cursive text.

The inventive method is employed beneficially in a multiplicity of different environments having to do with image classification and recognition and especially recognition of handwritten text and signatures. It is clear from the above prior art discussion that many of the prior art methods use a certain form of image transformation in order to generate characteristic parameters. Generally these parameter values are compared with corresponding reference parameter values in order to verify or recognize e.g. a signature. These reference parameter values generally are generated in a training session which employs the same method of image transformation and subsequent parameter calculation than the method serving to calculate the parameter values to be verified. This especially applies for the subject matter disclosed in European Patent Application EP-A-483,391, and U.S. Pat. Nos. 4,523,331; 4,972,499; 4,284,975; 4,972,496; and 4,731,857.

The inventive method is adapted to improve the performance of these prior art methods in that it substitutes known methods for transforming an image. The methods described in Published European Application EP-A-483,391 are especially improved, if the parameter values to be verified are not calculated directly from the digitized image, but from the image which is transformed according to the invention.

Accordingly, the present invention overcomes the limitations and disadvantages of the prior art systems and methods for transforming images in preparation for classification or recognition.

BRIEF DESCRIPTION OF THE DRAWINGS

In the following, preferred embodiments of the invention are described with reference to the drawing in which.

DESCRIPTION OF THE PREFERRED EMBODIMENTS

Figure 1:
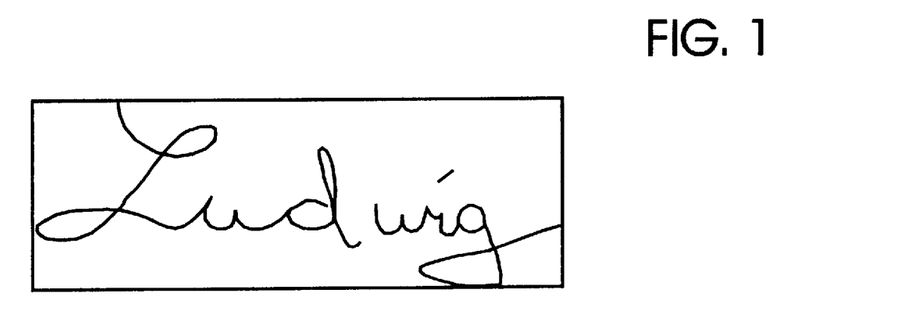
FIG. 1 shows an example of a signature which is to be transformed for clarification or recognition.

FIG. 2 depicts how the image of the signature shown in FIG. 1 is transformed according to the present invention. As it is shown in FIG. 2A, a first parallel projection 20 from the top defines a first boundary of the image of the signature to be transformed. This boundary is illustrated by the bold faced line portions 21. The shadows 22 which are produced by the first projection 20 are indicated by the hatching. The shadows cover those portions of the original image, which do not belong to the boundary 21.

A second projection 23 is carried out analogously. In the example shown in FIG. 2B the projection 23 is also a parallel projection, coming from the bottom of the image. Thereby, a second boundary of the original image is produced, which is indicated by the bold faced line portions 24. Shadows 25 are produced by the parallel projection 23, which is indicated by the hatching in FIG. 2B.

Figure 2A:
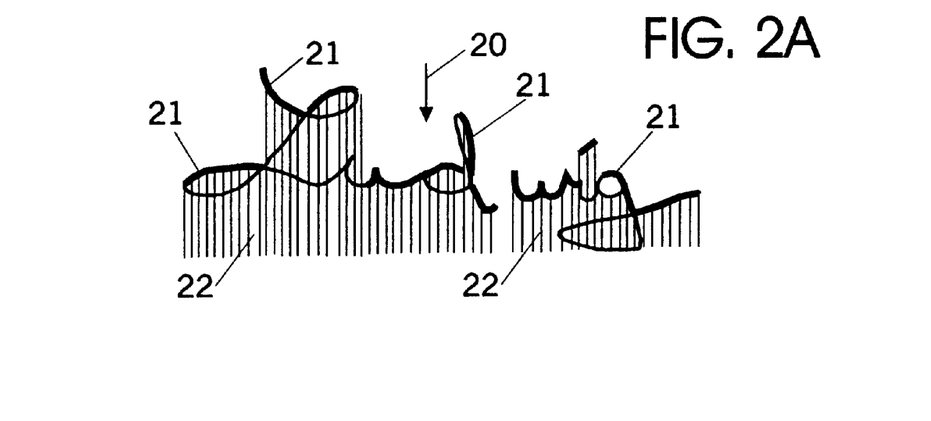
FIG. 2 illustrates a first example of a transformation of the signature of FIG. 1 according to the present invention by projections from the top and bottom.
Figure 2B:
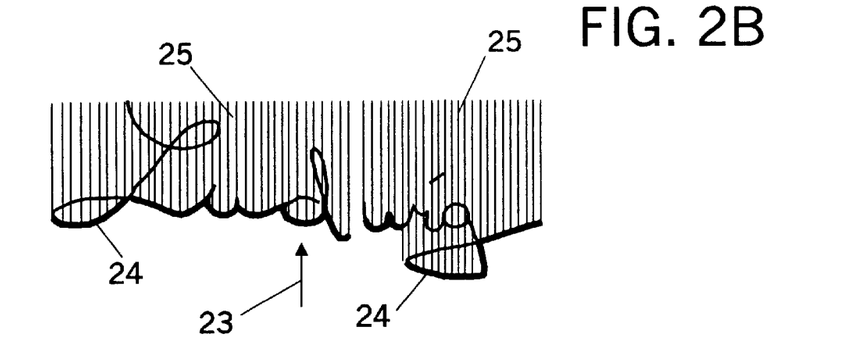
Figure 2C:
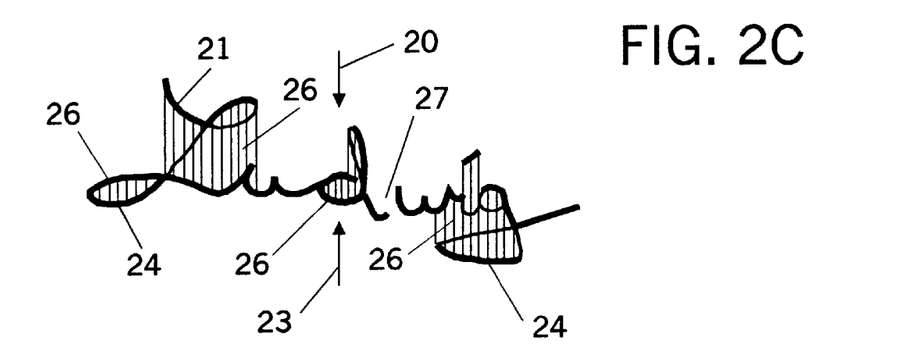

Subsequently, the results of the projection 20 and the projection 23 are combined. The result of that combination is shown in FIG. 2C. The resulting shadows 26 illustrated by the hatching in FIG. 2C occupy a smaller area than the shadows 22 and the shadows 25. Only those areas of the shadows 22 and the shadows 25, which overlap, contribute to the resulting shadows 26. In FIG. 2C the transformed image according to the invention is shown. This image is defined by the boundary 21 and the boundary 24 together with the resulting shadows 26.

Figure 2D:
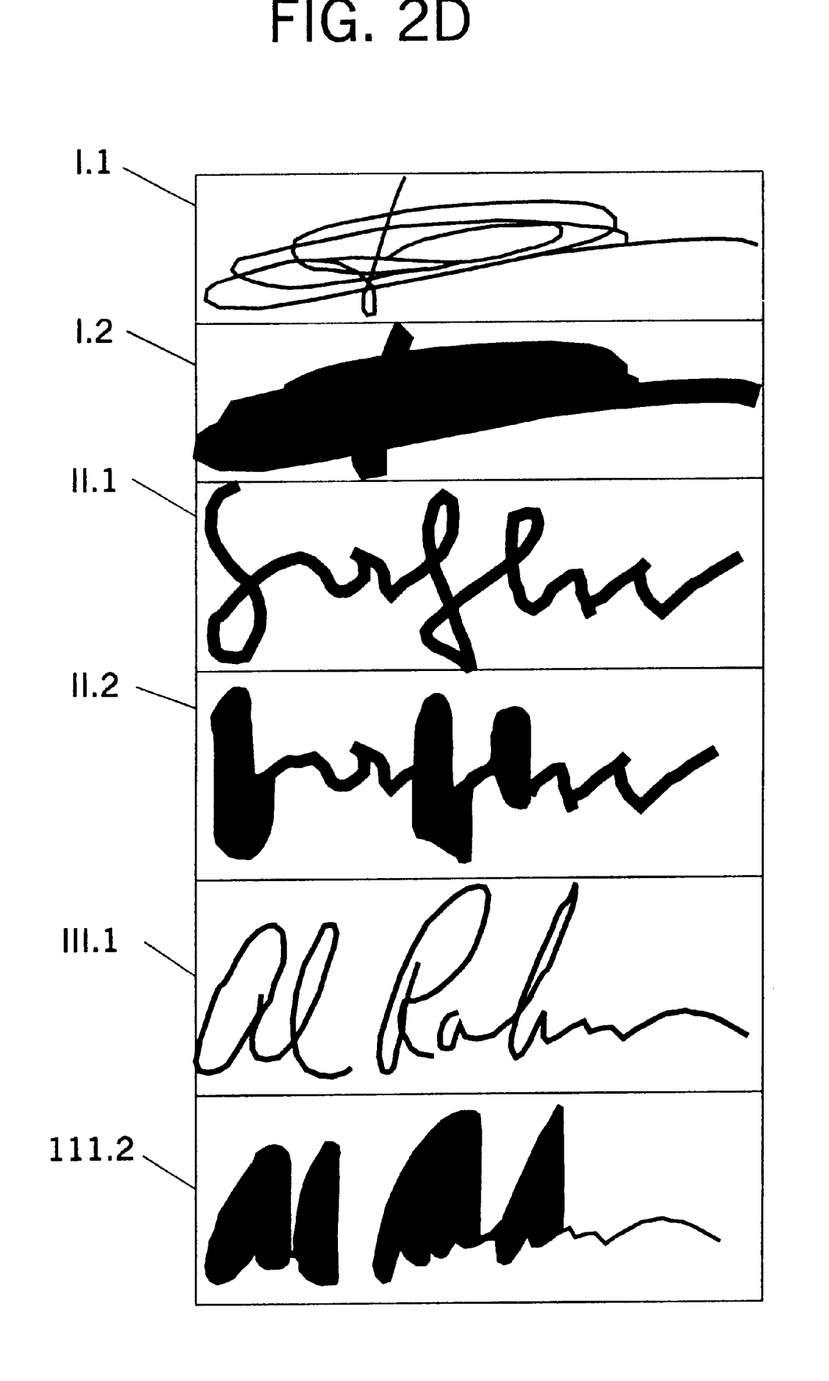

In FIG. 2D, further examples of the transformation shown in FIG. 2C are illustrated. In the boxes I.1, II.1 and III.1 images of three different signatures of an individual are given. The boxes I.2, II.2 and III.2 show the result of the transformation according to the invention whereby the same kind of projections 20 and 23 as shown in FIG. 2C is employed in the examples shown in FIG. 2D.

Figure 3A:
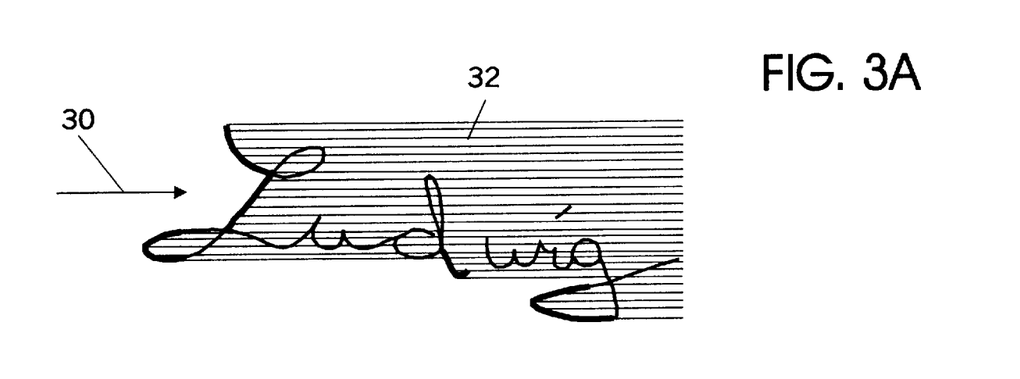
FIG. 3 illustrates a second example of a transformation of the signature of FIG. 1 according to the invention by projections from the left and the right.
Figure 3B:
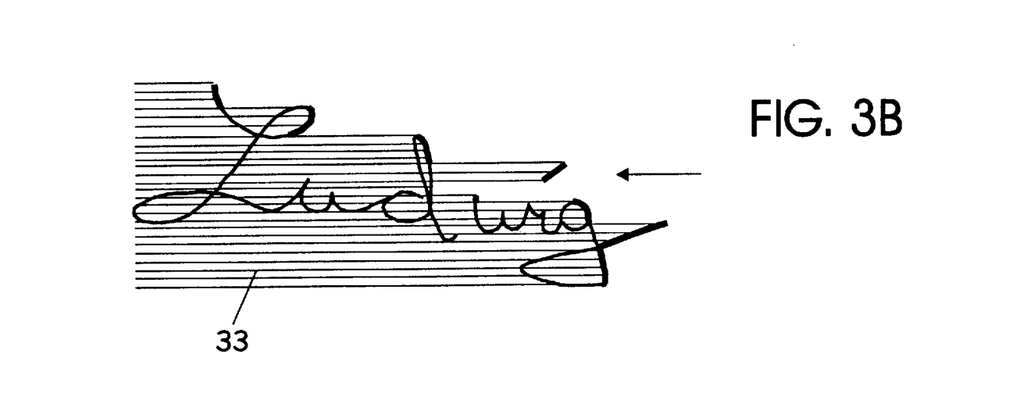
Figure 3C:
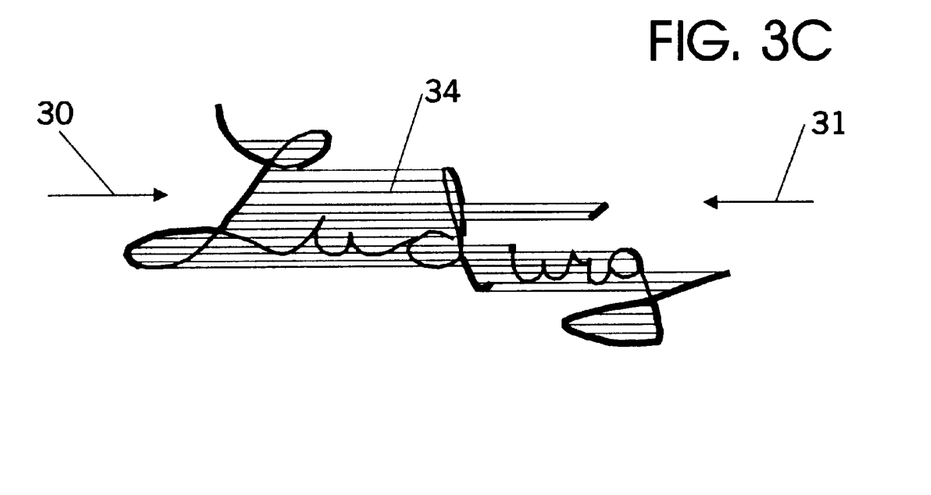

In FIG. 3, a further example of the method of the present invention, is shown. In this case, the transformation is carried out by a projection 30 coming from the left as it is shown in FIG. 3A and by a projection 31 coming from the right as it is shown in FIG. 3B. The respective boundaries defined by the projection 30 and the projection 31 again are indicated by the bold face line portions analogously to FIG. 2. In FIG. 3C the result of the transformation carried out by projections 30 and 31 is shown. Again, the transformed image is defined by the boundaries which are produced by the projections 30 and 31 and by the resulting shadows 34 which are produced by the projections 30 and 31. The resulting shadows 34 are defined by superposition of the shadows 32 and 33. Only those areas of the shadows 32 and 33 which overlap contribute to the resulting shadows 34. Again, this is analogous to the example shown in FIG. 2.

Figure 4:
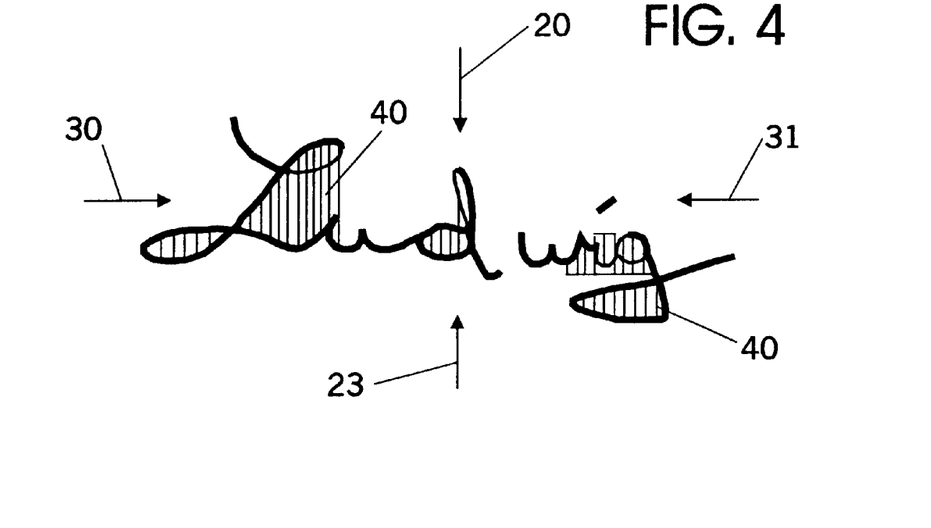
FIG. 4 illustrates a third example of a transformation of the signature of FIG. 1 according to the invention by projections from the top, bottom, left and the right.

FIG. 4 shows the resulting transformation of the four projections 20, 23, 30 and 31. The transformed image again is defined by the boundaries produced by each of the projections and the resulting shadows 40. The resulting shadows 40 are defined by superposition of the shadows 22, 25, 32 and 33, analogous to the examples shown in FIGS. 2 and 3, or with other words, by superposition of the shadows 26 and 34.

Figure 5A:
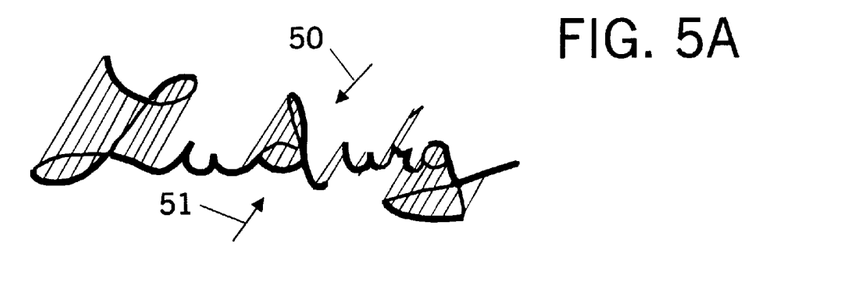
FIG. 5 illustrates a fourth example of a transformation of the signature of FIG. 1 according to the invention by inclined projections.
Figure 5B:
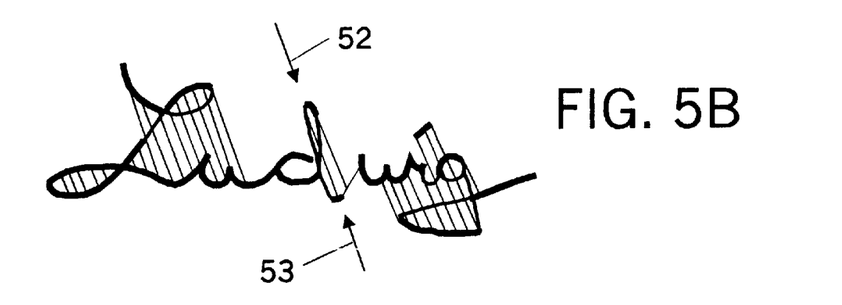
Figure 5C:
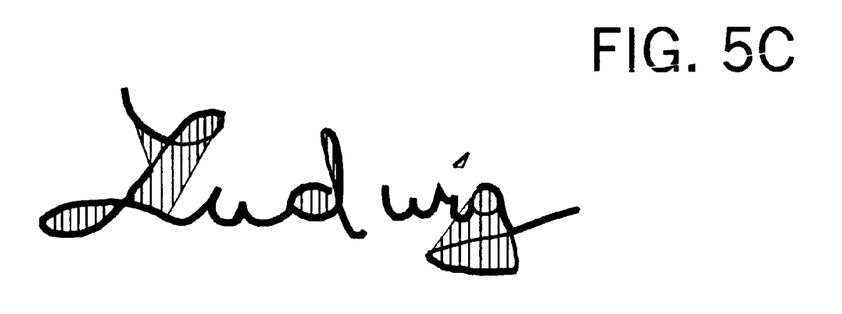

FIG. 5 shows a further example for a transformation of the original image according to the inventive method. In FIG. 5A, the result of the transformation by two parallel projections 50 and 51 is shown. In this case, the projections are inclined with respect to the vertical. In this example, the inclination angle to the vertical is about 30°. The same applies for the transformation shown in FIG. 5B which is carried out by the projections 52 and 53. The resulting transformed image which again is defined by superposition of the transformations of FIGS. 5A and 5B is shown in FIG. 5C.

Figure 6A:
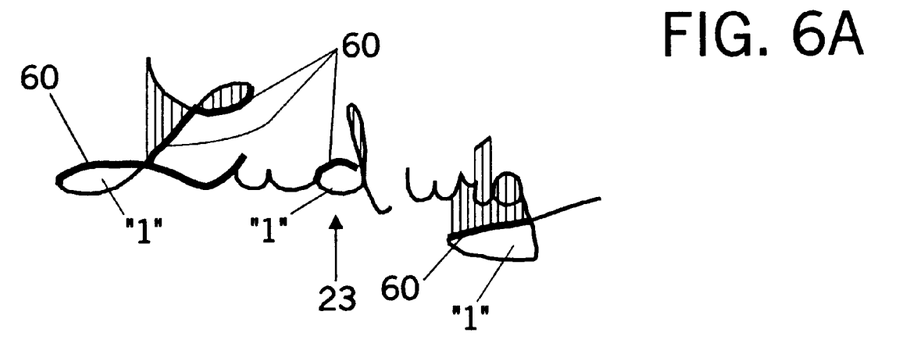
FIG. 6 illustrates by way of example the analysis of the internal structure of the shadows according to a first method of the invention.

With reference to FIG. 6 now, a method according to the invention to analyze the internal structure of the shadows is explained as follows. The point of departure of this method is the image which is transformed according to the invention. By way of example, the transformed image shown in FIG. 2C is considered again. In order to analyze the internal structure of the shadows 24 shown in FIG. 2C one of the projections 20 or 23 is carried out again. In the example shown in FIG. 6A the projection 23 is carried out again, while the boundary 24 is ignored. Thereby portions of the shadows 26 are deleted and a new boundary 60 is defined by the projection 23. A first identifier "1" is assigned to those portions of the shadows 26 which are deleted by the additional projection 23. This identifier indicates the complexity of the corresponding portion which is deleted.

Figure 6B:
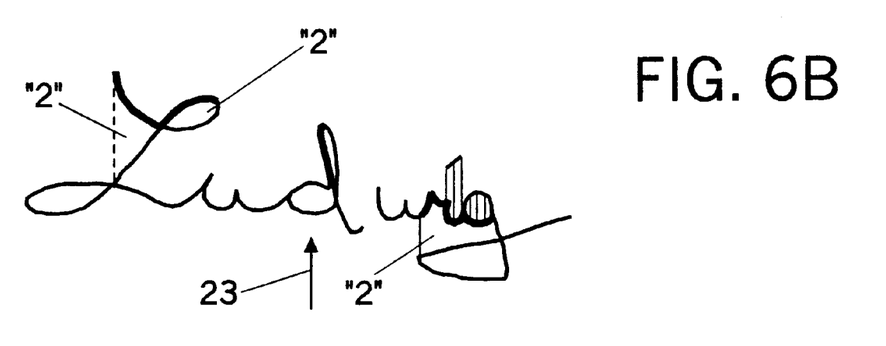

This procedure is carried out iteratively. The next iteration is illustrated in FIG. 6B. Analogous to the procedure of FIG. 6A a further projection 23 is carried out, while the boundaries which were previously defined by the projection 23, which are the boundaries 24 and 60, are ignored. Thereby further portions of the shadows 26 are deleted. These portions get an identifier assigned thereto, which again indicates the complexity of the area deleted in this iteration. In this example, the identifier which indicates the complexity is incremented by one with each iteration, so that in the example shown in FIG. 6B the areas of the shadows 26 which are deleted in this iteration get a "2" assigned thereto. This is also shown in FIG. 6B.

In the more general case, this method preferably is carried out by the following steps:

1. Choosing one of the projections carried out for the transformation of the original image,
2. carrying out this projection again, whereby the boundary as defined by the projection chosen in step 1 for the transformation of the original image is ignored. Thereby a further boundary of the image is defined.
3. Carrying out this projection again, whereby the further boundary as defined in step 2 is also ignored. Thereby an even further boundary of the image is defined.
4. Repeating step 3, until a termination condition is fulfilled. The even further boundary plays the role of the further boundary in the repetition of step 3.

The portions of the original shadows of the transformed image which are deleted by carrying out the projection chosen in step 1 get an identifier assigned thereto. The portions of the original shadow which are deleted in the ith repetition of this projection get the identifier "i" assigned thereto.

Figure 7A:
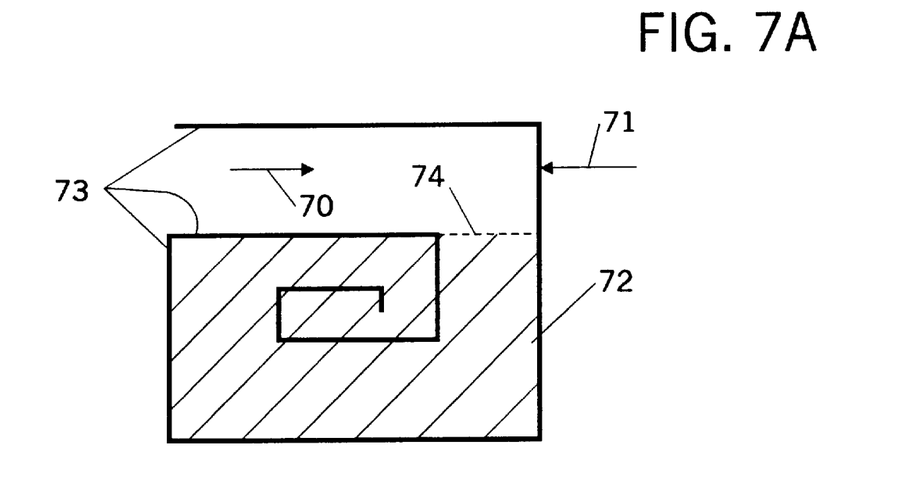
FIG. 7 illustrates by way of example the analysis of the internal structure of the shadows according to a second method of the invention.

An alternative method for analyzing the internal structure of the shadows is described in the following with reference FIG. 7. The original image of FIG. 7 is a spiral like line. The parallel projection 71 defines the boundary 72, whereas the projection 70 defines the boundary 73. The resulting shadow of these two projections is indicated by the hatching in FIG. 7A. A portion 74 of the border of the shadow shown in FIG. 7A is not limited by one of said boundaries 72 or 73.

Figure 7B:
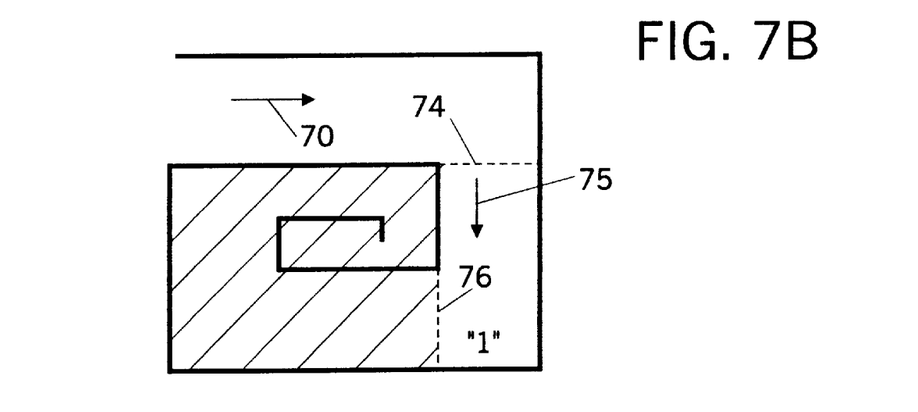

In the next step of this method a further projection 75 is carried out, whereby this further projection has a reference line orthogonal to the portion 74 of the border of the shadow. A portion 76 of the border of the resulting shadow which is illustrated by the hatching in FIG. 7B is not limited by one of the boundaries as defined by the projections 70, 71, and 75.

Figure 7C:
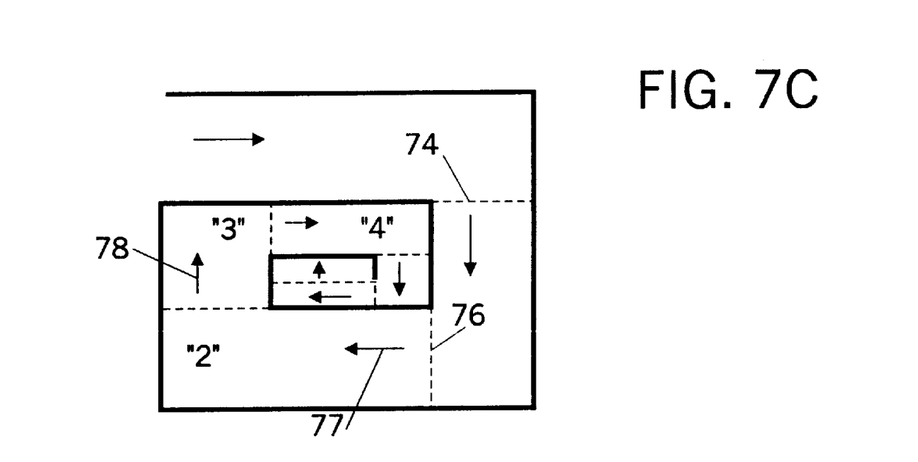

In the next step of this inventive method a further projection 77 is carried out, which has a reference line substantially orthogonal to said portion 76 of the border of the resulting shadow. This is repeated several times, as it is illustrated in FIG. 7C. Each repetition results in a further reduction of the area occupied by the original shadow. Each of the portions of the original shadow which is deleted in subsequent steps gets an identifier assigned thereto to indicate the complexity of said portion. The portion of the shadow which is deleted by the projection 75 has the identifier "1" assigned thereto, the portion of the shadow which is deleted by the projection 77 has the identifier "2" assigned thereto and the portion of the shadow which is deleted by the projection 78 has the identifier "3" assigned thereto. This is also illustrated in FIG. 7C. Every further projection results in a certain portion of the shadow which is deleted and that portion gets a specific identifier assigned thereto, which in this example is incremented with every further projection.

If there should be more than one portion of the border of the shadow which is not limited by the boundaries, a dedicated projection is carried out for each of these portions.

If such a portion does not exist, there is a region in the transformed image which is completely circumscribed by a number of boundaries. This circumscription is opened so that an arbitrary small portion of the border of the shadow is no longer limited by said boundaries. This opening is placed at an arbitrary location of the boundaries circumscribing the image. In the following the method described with referenced FIG. 7 is carried out analogously until a termination condition is fulfilled.

There are several possibilities to define a termination condition. The termination condition preferably is defined as a maximum number of iterations or a minimum size of the remaining shadow or a minimum change in the size of the remaining shadow from one iteration to the next. Another possible termination condition is the maximum computing time needed to carry out the methods which are described with reference to FIGS. 6 and 7.

According to a further preferred embodiment of the invention, the inventive method is employed to enhance the method of automatically verifying a signature of an individual disclosed in published European Patent Application EP-A-483,391. This document discloses a method of automatically verifying a signature of an individual with a computer system, comprising the following steps:

a) establishing a digitized image of said signature to be verified having a number of picture elements,
   b) calculating parameter values to be verified from said digitized image,
   c) comparing said parameter values to be verified with corresponding reference parameter values and
   d) depending on a difference of said parameter values to be verified and said reference parameter values, deciding if said signature of said individual is true or false.

According to the teaching of this present invention, in the reference signature analysis mode one or more different signatures of an individual are processed for storing sets of reference parameter values. This mode provides the basis for future verifications.

In the signature verification mode one present signature of an individual is processed for creating sets of parameter values to be verified. Depending on the stored sets of reference parameter values and the corresponding sets of parameter values to be verified it is decided if the present signature is true or false with regard to the corresponding reference signature or in other words if the individual who has written the present signature is identical with the individual who has written the reference signature. The method devised in published European Patent Application EP-A-483,391 is enhanced, if the digitized image established in the above described step a) is transformed according to the teaching of the invention. Consequently the parameter values to be verified are calculated from the transformed image and not from the original digitized image.

The same applies to the calculation of the reference parameter values which are produced in the reference signature analysis mode. The reference parameters are obtained not directly from the digitized image, but from the digitized image which is transformed according to the teaching of the invention.

The identifiers which are assigned to portions of the shadow which is deleted according to the preferred embodiments of the invention of FIGS. 6 and 7 are advantageously employed as parameter values to be verified.

Therefore the disclosure of EP-A-483,391 is explicitly incorporated herein by reference in its entirety. According to a further preferred embodiment of the invention the inventive method for transforming an image is employed for text segmentation. First an image of the text to be segmented is transformed according to the inventive method. Second, gaps in the transformed image are detected. An example of such a gap is shown in FIG. 2C and is indicated by the arrow 27. Thereby two segments of the word "Ludwig" are defined: These are the segments "Lud" and "wig".

If the text to be segmented has a certain slant, such as text printed in italics, it is advantageous to employ at least one projection having a reference line being substantially parallel to the slant of the text.

The above described method of text segmentation is also employed for the calculation of parameter values in step b)

of the above described enhanced method. The number and/or the position of the segments found serve as parameter values.

It is to be noted that each of the above described methods is carried out automatically by a computer system. The transformed image of FIG. 2C for example preferably is calculated by a computer system according to the following procedure:

a) searching for the first event in the direction of the first projection—in this case the vertical direction—from the top to the bottom where a pixel with a color density greater than zero is found;

b) searching for the first event in the direction of the second projection—in this case the vertical direction—coming from the bottom to the top where the color density of the pixel is greater than zero;

c) repeating this for all coordinates in the horizontal direction.

The transformed image is defined by the pixels found by the above procedure and the pixels between those pixels in the direction of the projections. These pixels which are between the pixels found in steps a) and b) constitute the shadows 26 of the transformed image.

Similar procedures are used, if other types of projections are employed in the method of the present invention. Examples are projections by a point source or other types of non parallel projections.

The method according to the invention is preferably employed in an apparatus such as a computer system, an automatic cash dispenser, an automatic teller machine, a scanner or a keyboardless entry computer system.

Of course, many modifications and alterations to the preferred embodiment described in the foregoing pages is possible without departing from the spirit of the present invention. It is also possible to use selected features of the present invention without the corresponding use of other features. Such changes would be well within the ordinary skill of those working in this art. Those skilled in the art will also recognize that a process for pattern recognition of the type contemplated by the present invention can also be used to advantage in image classification or automatic classification or for characterizing an image according to predetermined characteristics. The methods of the present invention are applicable to signature verification and to text processing and segmentation. Accordingly, the foregoing description of the preferred embodiment is provided only as illustrating the present invention and not in limitation thereof. The scope of the present invention is governed solely by the following claims.

Having thus described the invention, what is claimed is:

1. A method of transforming an image for pattern recognition comprising the steps of:

a) defining a first boundary of said image by a first projection;

b) defining a secondary boundary of said image by a second projection, said second projection being distinct from said first projection and defining one or more further boundaries of said image by one or more further projections, one of said further projections resulting in a minimal shadow, said one of said further projections having a reference line substantially parallel to a slant of a character of said image;

c) defining a transformed image by said boundaries of said image and resulting shadow or shadows of said projections;

d) repeating at least one of said projections while ignoring one of said boundaries of said image; and e) repeating step d) iteratively until a termination condition is fulfilled.

2. A method of transforming an image including the steps of claim 1, further comprising the steps of:

f) searching for a portion of the border of at least one of said shadows, which is not limited by one of said boundaries;

g) deleting at least a portion of said shadow by a projection having a reference line substantially orthogonal to said portion of the border; and h) carrying out steps f) and g) iteratively until a termination condition is fulfilled.

3. A method of transforming an image including the steps of claim 2, further comprising the steps of:

i) assigning a first identifier to that portion of said shadow which is deleted due to the projection carried out in step of deleting at least a portion of the shadow; and j) assigning an ith identifier to that portion of said shadow which is deleted due to the ith projection carried out in the ith iteration of deleting the portion of the shadow.

4. A method of transforming an image including the steps of claim 1 and further comprising the steps of:

f) identifying a region of said transformed image being completely circumscribed by a number of said boundaries;

g) opening said circumscribed region so that a portion of a shadow being comprised in said region is no longer limited by one of said boundaries;

h) deleting at least a portion of said shadow by a projection having a reference line substantially orthogonal to said portion of the border; and i) carrying out the steps f), g) and h) iteratively until a termination condition is fulfilled.

5. A method of transforming an image including the steps of claim 1 wherein said termination condition includes one chosen from the following conditions of a maximum number of iterations, a minimum size of a remaining shadow, a minimum change in the size of the remaining shadow from one iteration to the next and a maximum computing time and said termination condition is fulfilled, if no shadow is left.

6. A method of text segmentation comprising the steps of:

a) transforming a digitized image of said text according to the method of claim 1;

b) detecting gaps in said transformed image; and c) segmenting said text into text segments and gaps, such as words or individual characters, whereby said gaps deliminate each segment.

7. The method of text segmentation including the steps of claim 6, wherein the text includes a slant and one of said projections has a reference line being substantially parallel to the slant of the text to be segmented.

8. Apparatus of claim 1, further comprising:

means for searching for a portion of the border of at least part of said shadow which is not limited by one of said boundaries;

means for deleting at least a portion of said shadow by a projection having a reference line substantially orthogonal to said portion of the border.

9. An apparatus for transforming an image for pattern recognition, comprising:

a) means for defining a first boundary of said image by a first projection;

b) means for defining a second boundary of said image by a second projection, said second projection being distinct from said first projection;

c) repeating at least one of said projections while ignoring one of said boundaries of said image;
d) repeating step c) iteratively until a termination condition is fulfilled;
e) means for defining a shadow defined by said first and second boundaries and for using said shadow in pattern recognition, whereby the transformed image is defined by said boundaries and one resulting shadow of said projections; and
f) means for defining a further boundary of said image by a further projection, said further projection resulting in a minimal shadow and having a reference line substantially parallel to a slant of a character of said image.

* * * * *